US010662500B2

(12) United States Patent
Peters et al.

(10) Patent No.: US 10,662,500 B2
(45) Date of Patent: May 26, 2020

(54) PROCESS FOR THE RECOVERY OF PRECIOUS METAL FROM PETROCHEMICAL PROCESS RESIDUES

(71) Applicants: Heraeus Deutschland GmbH & Co. KG, Hanau (DE); Heraeus Precious Metals North America LLC., Santa Fe Springs, CA (US)

(72) Inventors: Brian Peters, Wartburg, TN (US); Jimmy Taylor, Sunbright, TN (US); Chris Hobbs, Knoxville, TN (US); Felix Stoffner, Oak Ridge, TN (US); Holger Winkler, Darmstadt (DE); Thomas Richards, Sr., Wartsburg, TN (US)

(73) Assignees: HERAEUS DEUTSCHLAND GMBH & CO. KG, Hanau (DE); HERAEUS PRECIOUS METALS NORTH AMERICA LLC, Santa Fe Springs, CA (US)

( * ) Notice: Subject to any disclaimer, the term of this patent is extended or adjusted under 35 U.S.C. 154(b) by 227 days.

(21) Appl. No.: 15/878,533

(22) Filed: Jan. 24, 2018

(65) Prior Publication Data

US 2019/0226053 A1     Jul. 25, 2019

(51) Int. Cl.
C22B 11/02     (2006.01)
F23G 7/05     (2006.01)

(52) U.S. Cl.
CPC .......... *C22B 11/023* (2013.01); *C22B 11/026* (2013.01); *F23G 7/05* (2013.01); *C10G 2300/1007* (2013.01); *C10G 2300/205* (2013.01); *Y02P 10/214* (2015.11); *Y02P 10/234* (2015.11)

(58) Field of Classification Search
CPC .... C22B 11/023; C22B 11/042; Y02P 10/214; Y02P 10/234; F23G 7/05; C10G 2300/1007; C10G 2300/205
See application file for complete search history.

(56) References Cited

U.S. PATENT DOCUMENTS

| 3,920,449 | A | 11/1975 | Onoda et al. |
| 9,464,340 | B2 * | 10/2016 | Romero ............... C22B 5/10 |
| 2005/0217422 | A1 | 10/2005 | Makinen et al. |
| 2012/0118108 | A1 | 5/2012 | Dobbelaere et al. |

FOREIGN PATENT DOCUMENTS

| CN | 105387470 A | | 3/2016 |
| GB | 2101497 A | | 1/1983 |
| JP | 2009-179543 | * | 8/2009 |
| JP | 2016-011449 | * | 1/2016 |

OTHER PUBLICATIONS

JP 2009-179543 machine translation of the description (Year: 2009).*
JP 2009-179543 machine translation of the description (Year: 2016).*

* cited by examiner

Primary Examiner — Tima M. McGuthry-Banks
(74) Attorney, Agent, or Firm — Blank Rome LLP

(57) ABSTRACT

A process for the recovery of precious metal (PM) from PM oil, the process including combustion of PM oil within a furnace, where the PM oil is burned in atomized form.

13 Claims, No Drawings

PROCESS FOR THE RECOVERY OF PRECIOUS METAL FROM PETROCHEMICAL PROCESS RESIDUES

FIELD OF THE INVENTION

The invention relates to a process for the recovery of PM (precious metal) from petrochemical process residues.

BACKGROUND

The term "PM" used herein means platinum, palladium, ruthenium and, in particular, rhodium.

Various large-scale petrochemical processes are performed under homogeneous catalysis of PM complex compounds. Well-known examples of the latter include rhodium complex compounds; one specific example of such type of catalyst is the famous Wilkinson catalyst which is used in hydrogenations and hydroformylations, for example.

Residues originating from homogeneous catalyzed petrochemical processes comprise PM in the form of PM complex compounds and/or derivatives thereof. The derivatives are formed during the petrochemical processes over time by chemical conversion or decomposition of the original PM complex compounds; in other words, the homogeneous catalysts suffer from exhaustion over time. Petrochemical process residues comprise in particular distillation bottoms (distillation residues) of petrochemical processes such as, for example, hydrogenation, hydroformylation or other petrochemical reactions. Petrochemical process residues represent waste material comprising exhausted catalyst. The waste material is typically liquid and high-caloric. In the following, PM containing petrochemical process residues are also called PM oil, for brevity. The PM content within such PM oil waste material is relatively low and lies in the range of, for example, 0.01 to 0.8 wt.-% (weight-%), calculated as PM.

Due to their high value, it is desired to recover PM contained in PM oil; it is hence common practice to burn PM oil in order to obtain a PM-enriched residue material which can be further refined. To this end, it has been common practice to slowly inject PM oil, e.g. with a lance, into a suited container or pond that is located in a furnace, e.g. a pan within a furnace room. The PM oil is ignited in the container and burned. The combustion off-gas is transferred into a conventional abatement system. The combustion residues have a higher PM content than the PM oil. However, this state of the art combustion process exhibits various drawbacks and weaknesses. One weakness of this technique is its low combustion rate. The PM oil to be burned may foam up or build up a crust during its combustion. Once a crust sits on the PM oil, the combustion process is stopped and thus efficiency is reduced. Captured unburned PM oil may become a potential danger due to unexpected combustion if it gets into contact with oxygen when moving the hot container.

DETAILED DESCRIPTION

The applicant has developed an improved and inventive process for the recovery of PM from PM oil. Hence, the invention relates to a process for the recovery of PM from PM oil. The invention relates in particular to a process for the combustion of PM oil within a furnace, wherein the PM oil is burned in atomized form.

As will become apparent from the following disclosure, the process of the invention speeds up the recycling of PM from PM oil, delivers PM oil combustion residues with a higher PM content, requires less or even no auxiliary fuel and is safer than the state of the art combustion process in a furnace.

The PM oil which is burned in the process of the invention may have a PM content in the range of, for example, 0.01 to 0.8 wt.-%. The PM content may be formed by one, two or more PMs. The one, two or more PMs may be present in chemical compound form in particular. In a typical embodiment, the at least one PM comprises rhodium or it consists mainly or even only of rhodium. In case rhodium is the main (rhodium content >50 wt.-% of the PM content) or even the only PM, the PM oil is called rhodium oil. The one or more PM compounds within the PM oil may be dissolved therein, dispersed therein and/or somehow aggregated with or adsorbed to other optionally present disperse PM oil constituents. Besides the at least one PM compound, the PM oil comprises a complex mix of PM-free organic compounds, mainly hydrocarbons. The PM-free organics' content lies in the range of, for example, 79.2 to 99.99 wt.-% and it includes any optionally present oligomeric and/or polymeric organic matter. In embodiments, the PM oil may further comprise, for example, up to 20 wt.-% of one or more inorganic substances, such as, in particular, water. In an embodiment, it may comprise an up to 20 wt.-% fraction of solid particles. The rheological behavior of the PM oil covers a viscosity range extending from gasoline viscosity to heavy oil viscosity. Typically the PM oil's viscosity is comparable with that of diesel fuel. The PM oil is a flammable or combustible liquid.

In case the PM oil comprises a considerable amount of water and/or solid particles, that is, an amount which leads to phase separation phenomena within the PM oil, it is expedient to mix or stir the PM oil so as to keep it in an emulsified and/or dispersed state prior to becoming atomized and burned.

In the process of the invention the PM oil is burned in atomized form, that is, as fine spray droplets. To this end, it may be burned after its passage through a misting device which serves the PM oil atomization purpose. Ignition of the PM oil spray may be performed by provision of an ignition spark. However, in order to ensure a continuous combustion of the PM oil, it is preferred to spray the PM oil into a pilot flame, that is, to convey the atomized PM oil into a pilot flame. The pilot flame may be run with natural gas, for example. The pilot flame may be run continuously or only on demand. Once ignited the PM oil spray flame may burn independently or the pilot flame may be kept burning.

It is preferred to work with a PM oil: oxygen ratio which enables or ensures an at least essentially complete combustion of the PM oil's organic content. In other words, it is preferred to run the PM oil combustion process of the invention with a stoichiometric amount or even a stoichiometric excess of oxygen. This measure minimizes or even prevents the formation of soot during the combustion of the atomized PM oil.

In a preferred embodiment, the PM oil may be burned utilizing a forced-air burner which may be driven with air or oxygen-enriched air. A forced air-burner is a conventional device. It works according to the well-known principle of a conventional fuel oil burner and comprises a blower wheel and a jet nozzle which serves the liquid fuel atomization purpose. The forced air burner may be equipped with said pilot flame burner.

The combustion process of the invention uses the PM oil itself as fuel. It is advantageous that it does not require the use of any auxiliary fuel with the possible exception of running said continuous or discontinuous pilot flame. The optional pilot flame may serve a reigniting purpose in case the PM oil flame is interrupted or extinguishes unexpectedly or undesirably during the combustion process of the invention.

As a result of the combustion process of the invention a combustion off-gas is formed. Besides the constituents carbon dioxide, water and, optionally, any other gaseous compounds, the combustion off-gas contains PM oil combustion residues which comprise the desired PM. The term "PM oil combustion residues" used here, in the following disclosure and in the claims shall mean those PM oil combustion residues which are non-gaseous at 20° C. and $10^5$ Pa. The PM oil combustion residues comprise the PM(s) essentially as PM oxide(s) with a content in the range of, for example, 70 to 95 or even 70 to 100 wt.-% of PM oxide(s), based on total PM oil combustion residues. Besides the PM oxide(s) the PM oil combustion residues may comprise in particular carbon (soot) and/or phosphorus oxide.

The combustion takes place in an enclosed furnace chamber which is equipped with an exhaust or abatement system. The furnace chamber is equipped with a PM collector, that is, a collector for the PM oil combustion residues contained in the combustion off-gas.

In an embodiment, the PM collector may be an air- or water-cooled container on the walls of which the PM oil combustion residues can be deposited. After the combustion off-gas has passed the PM collector and before it has left the exhaust or abatement system, it is expedient, to treat the off-gas by passing it through one or more auxiliary collecting means in order to recover also that fraction of the PM oil combustion residues which has not been deposited on the PM collector or, more precisely, which has not been deposited on the PM collector walls. Examples of such auxiliary collecting means include cyclone filter devices, fine particles (dust) filters and scrubber systems, such as, scrubber systems based on Venturi jet technology.

After completion of the combustion process of the invention, the PM oil combustion residues may be collected from the inner walls of the furnace chamber and its exhaust or abatement system, from the PM collector walls and, if applicable, also from the auxiliary collecting means. Collecting may be performed, for example, by scratching the PM oil combustion residues off from said walls' surfaces.

The PM oil combustion residues can be subjected to conventional and well-known PM refining, for example, wet-chemical or hydrometallurgical PM refining. If a carbon content of the PM oil combustion residues extends beyond 5 wt.-%, it may be expedient to incinerate such material prior to transfer to said PM refining.

In an embodiment, the furnace chamber may comprise an auxiliary PM collector in particular for collecting eventually straying unburned PM oil droplets. The auxiliary PM collector shall not be confused with the aforementioned auxiliary collecting means. The auxiliary PM collector may contain coke or charcoal as PM oil absorber and/or adsorber material or, more precisely, as PM oil droplet absorber and/or adsorber material. After conclusion of the combustion process of the invention, such coke or charcoal comprising absorbed and/or adsorbed PM oil may be burned separately under formation of a PM containing ash, which can be subject to conventional and well-known PM refining, for example, wet-chemical or hydrometallurgical PM refining.

The invention comprises the following embodiments:

1. A process for the recovery of PM from PM oil comprising combustion of PM oil within a furnace, wherein the PM oil is burned in atomized form.
2. The process of embodiment 1, wherein the PM oil has a PM content in the range of 0.01 to 0.8 wt.-%, and wherein the PM content is formed by one, two or more PMs.
3. The process of embodiment 1 or 2, wherein the PM oil comprises rhodium.
4. The process of embodiment 1, 2 or 3, wherein the PM oil is sprayed into a pilot flame.
5. The process of any one of the preceding embodiments, wherein the PM oil combustion is performed with a stoichiometric amount or a stoichiometric excess of oxygen.
6. The process of any one of the preceding embodiments, wherein the PM oil is burned utilizing a forced-air burner which may be driven with air or oxygen-enriched air.
7. The process of any one of the preceding embodiments, wherein the PM oil combustion takes place in an enclosed furnace chamber with an exhaust or abatement system, wherein the furnace chamber is equipped with a PM collector for the PM oil combustion residues contained in the combustion off-gas.
8. The process of embodiment 7, wherein the PM collector is an air- or water-cooled container at the walls of which the PM oil combustion residues can be deposited.
9. The process of embodiment 8, wherein the combustion off-gas, after it has passed the PM collector and before it has left the exhaust or abatement system is treated by passing it through one or more auxiliary collecting means in order to recover also that fraction of the PM oil combustion residues which has not been deposited at the PM collector.
10. The process of embodiment 9, wherein the one or more auxiliary collecting means is/are selected from the group consisting of cyclone filter devices, fine particles filters and scrubber systems.
11. The process of any one of the preceding embodiments, wherein the PM oil combustion residues are subject to wet-chemical or hydrometallurgical PM refining.
12. The process of any one of the embodiments 7 to 11, wherein the furnace chamber contains an auxiliary PM collector.
13. The process of embodiment 12, wherein the auxiliary PM collector contains coke or charcoal as PM oil absorber material.

What is claimed is:

1. A process for the recovery of a precious metal from an oil comprising a precious metal and organic compounds, the process comprising:
    atomizing the oil;
    combusting the atomized oil to produce an off-gas; and
    passing the off-gas over a precious metal collector to separate oil combustion residue containing a precious metal from the remainder of the off-gas, wherein the residue is non-gaseous at 20° C. and $10^5$ Pa, wherein
        the combustion takes place in an enclosed furnace chamber with an exhaust or abatement system, wherein the furnace chamber is equipped with the precious metal collector;
        the precious metal collector is an air- or water-cooled container; and
        the oil combustion residue becomes deposited on walls of the precious metal collector as the off-gas passes through the precious metal collector.
2. The process of claim 1, wherein the oil has a precious metal content in the range of 0.01 to 0.8 wt.-%.
3. The process of claim 2, wherein the precious metal content is composed of more than one precious metals.

4. The process of claim 1, wherein the oil comprises rhodium.

5. The process of claim 1, wherein the atomized oil is sprayed into a pilot flame.

6. The process of claim 1, wherein the oil combustion of the atomized oil is performed with a stoichiometric amount or a stoichiometric excess of oxygen.

7. The process of claim 1, wherein the atomized oil is combusted utilizing a forced-air burner.

8. The process of claim 1, wherein the off-gas, after it has passed the precious metal collector and before it has left the exhaust or abatement system, is treated by passing it through one or more auxiliary collecting means in order to recover oil combustion residues containing a precious metal which has not been deposited on the precious metal collector.

9. The process of claim 8, wherein the one or more auxiliary collecting means is/are selected from the group consisting of cyclone filter devices, fine particles filters and scrubber systems.

10. The process of claim 1, wherein the oil combustion residue is subjected to wet-chemical or hydrometallurgical metal refining.

11. The process of claim 1, wherein the furnace chamber contains an auxiliary precious metal collector.

12. The process of claim 11, wherein the auxiliary precious metal collector contains coke or charcoal as a precious metal oil absorber material.

13. The process of claim 7, wherein the forced-air burner is driven with air or oxygen-enriched air.

* * * * *